Oct. 13, 1959  E. LOSSAU  2,908,510
FRAME STRUCTURE FOR GOLF BAG MOTOR SCOOTER
Filed June 17, 1957
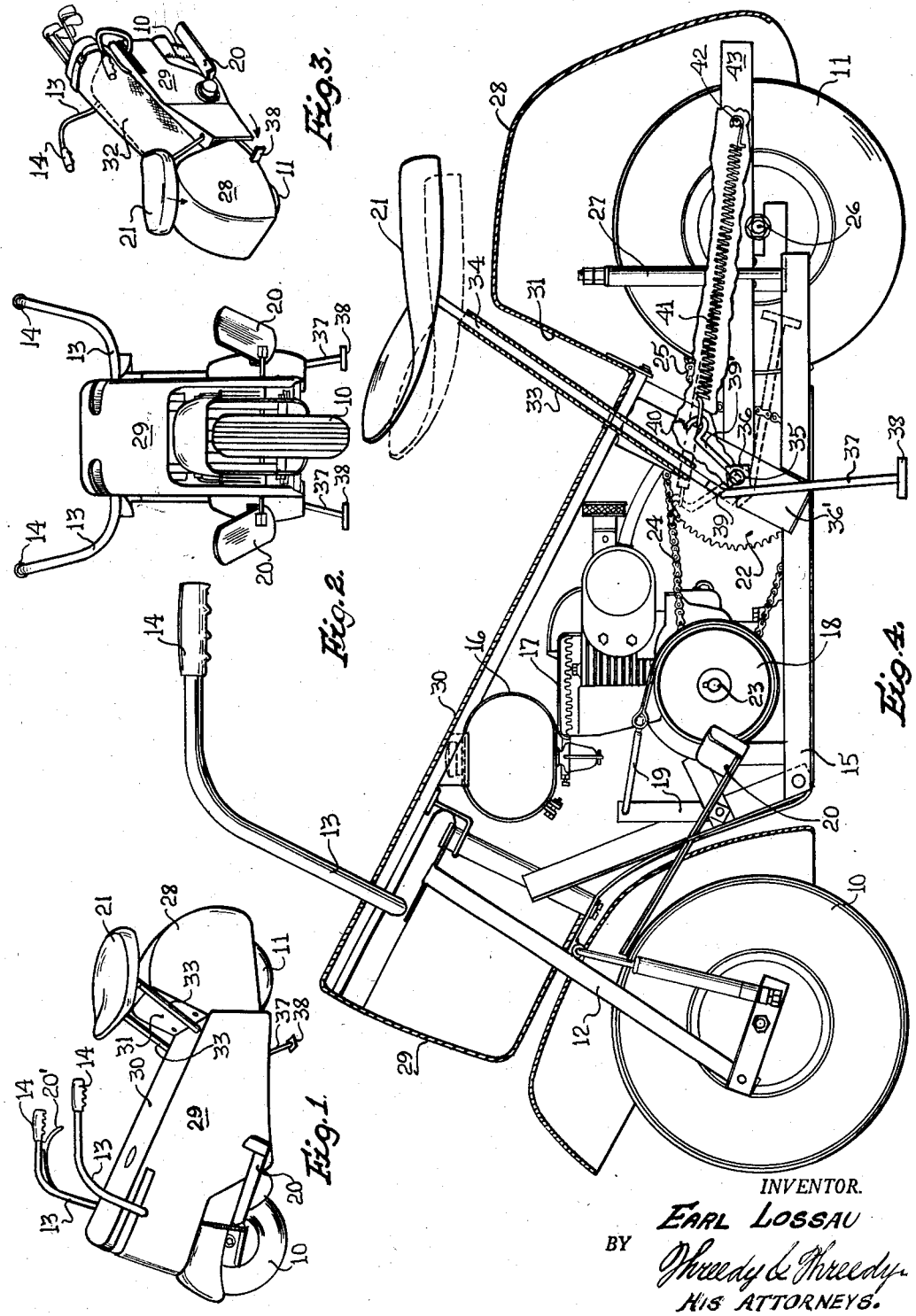
INVENTOR.
*Earl Lossau*
BY *Threedy & Threedy*
HIS ATTORNEYS.

United States Patent Office 2,908,510
Patented Oct. 13, 1959

2,908,510

FRAME STRUCTURE FOR GOLF BAG MOTOR SCOOTER

Earl Lossau, Wheeling, Ill., assignor, by mesne assignments, to Bobcat Corporation, Wheeling, Ill., a corporation of Illinois Application June 17, 1957, Serial No. 666,108

2 Claims. (Cl. 280—281)

My invention relates to new and useful improvements in a frame structure for Golf Bag Motor Scooter and has for its principal object the provision of a new and useful improved structure of the character hereinafter described, which will be highly efficient in use, economical in manufacture and convenient of operation for the intended purpose.

Ancillary to the foregoing object is a novel arrangement for positioning and supporting a golf bag and its contents upon the frame work of the scooter within an area which will in no way interfere with the operator mounting and dismounting from the scooter.

Yet another object of the invention is to provide a scooter of the character hereinafter described which comprises relatively few parts resulting in economical manufacture of a scooter which will have a minimum amount of weight.

Other objects will appear hereinafter.

The invention consists in the novel combination and arrangement of parts to be hereinafter described and claimed.

The invention will be best understood by reference to the accompanying drawings showing the preferred form of construction, and in which:

Fig. 1 is a perspective view of my improved scooter with the golf bag and its contents removed therefrom;

Fig. 2 is a front elevational view of the scooter as viewed in Fig. 1;

Fig. 3 is a perspective view of the scooter in non-braced position showing the golf bag and its contents mounted thereon; and Fig. 4 is a vertical sectional detail view of the same.

The several objects of my invention are accomplished by the preferred form of construction shown in the accompanying drawings and in which drawings 10 indicates a front wheel and 11 a rear wheel.

The front wheel is associated with a steering structure 12 having substantially U-shaped steering or handle bars 13, the opposite arm portions of which carry hand gripping caps 14.

In any suitable manner the steering structure is associated with the chassis or frame work 15 of the scooter which frame work supports, among other things, a fuel tank 16, an internal combustion engine 17 on the operating shaft of which is mounted a brake drum 18. The brake drum 18 through a linkage 19 is operatively associated with brake pedals 20 adjacent the steering structure 12 and so arranged that when a rider is mounted upon the seat 21, his feet will rest upon the brake pedals 20.

A driving gear is indicated at 22 and is operatively connected to a similar gear on the drive shaft 23 of the motor 17 by means of a sprocket chain 24. Said driving gear 22 drives a sprocket chain 25 which in turn drives the rear wheel 11 through the medium of a sprocket gear (not shown) mounted on the shaft 26 of the rear wheel structure 11.

The frame 15 has associated therewith suitable shock absorbers 27 to absorb shocks transmitted through the steering structure 12 and the rear wheel structure 11.

A hood 28 is mounted to cover the upper portion of the rear wheel structure. Extending forwardly from this hood 28 in an upward direction is an enclosure 29 which encloses the frame structure 15 and the parts carried thereby including the fuel tank 16 and internal combustion engine 17.

The top wall 30 of this enclosure is relatively flat and substantially rectangular in plan view and occupies the space between the handle bars 13. The hood 28 has a wall 31 which extends substantially at right angles with respect to the top wall 30 at its lower rear end portion. The walls 30 and 31 provide a support upon which the golf bag 32 and its contents is positioned. When such bag is positioned on such support, the base of the bag will rest against the wall 31 of the hood 28 while the bag 32 will be positioned between the arms 13 and be resting on the wall 30 in a longitudinal direction.

Carried by the frame structure 15 on opposite sides thereof are elongated parallel extending tubes 33. Extending from the seat 21 are spaced parallelly extending rods 34 which are slidably arranged in the tubes 33. An elongated shaft 35 rotatably extends from opposite sides of a frame section 36' of the structure 15. Fixed to the ends of the shaft 35 are bearing blocks 36. Each bearing block 36 carries a foot 37 having an enlarged base 38. The upper end portions of the feet 37 are each angled as at 39 so that when the feet 37 are in bracing position, the ends 39 will be disposed in abutment with the lower end portions of the rods 34.

Secured to the shaft in any suitable manner is a finger 39' having a hook-shaped end portion 40. Secured to this hook-shaped end portion is one end portion of a spring 41, the opposite end portion of the spring being connected to the stud 42 carried by an element 43 of the frame structure 15.

As shown in Fig. 3 when the golf bag 32 and its contents is disposed upon the support provided by the walls 30 and 31, the forward end portion of the golf bag will be between the handle bars 13 and the base thereof between the tubes 33 below the seat 21 and with the base of such bag in abutment with the wall 31. In such position the golf bag and its contents is securely carried by the scooter and in inclined position so that the contents of the bag 32 can not be disposed from within the bag during the riding operation of the scooter.

When the rider has reached the predetermined destination he dismounts from the seat 21, either by moving his body rearwardly so as to clear the hood 28 or in any other convenient manner. As the weight of the rider is removed from the seat 21, the feet 37, under the action of the spring 41, will be pivoted to a vertical position with respect to the scooter with the enlarged base portions engaging the ground whereby to support and maintain the scooter in an upright position.

From the foregoing description, it will be therefore apparent that I have provided in a golf bag motor scooter a simple arrangement for automatically bracing the scooter and supporting the same in an upright position automatically as soon as the weight of the rider has been removed from the seat.

In addition, I have provided in a scooter a novel arrangement for supporting a golf bag and its contents upon a scooter in a manner such that the bag will not interfere with the riding of the scooter or the mounting or dismounting of the rider on the seat and with the golf bag supported in a position such that the contents thereof will not be disposed from the bag.

It is obvious that when the rider mounts the scooter and disposes his weight upon the seat, the feet 37, under the weight of the rider will be automatically pivoted against the action of the spring 41 to a substantially horizontal position as shown in Fig. 3, free from interference with the ground. When the rider is mounted upon the seat 21, his feet will rest upon the brake pedals 20. Acceleration of the scooter is controlled by an accelerator hand lever 20'.

When the bag 22 is mounted upon its support, it will not interfere with steering of the scooter or with movement of the seat 21, the latter under the weight of the rider. My improved scooter is relatively simple and will be of great convenience in transporting a golf player and the golf bag and its contents thereof from one position to another, thus eliminating the necessity of the golf player carrying a substantial weight in the form of a golf bag and its contents.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. In combination with a motor scooter in which there is a pair of spaced handle bars and a seat supporting structure comprising spaced elongated members and a frame work supporting said elongated members, of an enclosure for the upper portion of the motor scooter including a rear hood portion having an inclined vertically extending wall portion, said enclosure including an elongated relatively flat upwardly inclined wall extending between the handle bars and said elongated members and terminating at its lower end portion with said wall portion of said hood to provide together with said wall portion a support for a golf bag and its contents with the one end portion of the golf bag disposed between the handle bars and between said elongated members and with the base of the golf bag in bearing relation with said wall of said hood portion.

2. In combination with a motor scooter in which there is a pair of spaced handle bars and a seat supporting structure comprising spaced elongated members and a frame work supporting said elongated members, of an enclosure for the upper portion of the motor scooter including a rear hood portion having an inclined vertically extending wall portion, said enclosure including an elongated relatively flat upwardly inclined wall extending between the handle bars and said elongated members and terminating at its lower end portion with said wall portion of said hood to provide together with said wall portion a support for a golf bag and its contents with the one end portion of the golf bag disposed between the handle bars and between said elongated members and with the base of the golf bag in bearing relation with said wall of said hood portion, said lower end portion of said golf bag being in a plane below the seat of said scooter.

References Cited in the file of this patent

UNITED STATES PATENTS

| | | |
|---|---|---|
| 1,371,736 | Christian | Mar. 15, 1921 |
| 2,035,462 | Courtney | Mar. 31, 1936 |
| 2,378,961 | Wallace et al. | June 26, 1945 |
| 2,525,877 | Dolphin | Oct. 17, 1950 |
| 2,541,952 | Williams | Feb. 13, 1951 |
| 2,755,873 | Klaue | July 24, 1956 |

FOREIGN PATENTS

| | | |
|---|---|---|
| 72,305 | Denmark | Mar. 19, 1951 |
| 209,196 | Great Britain | Jan. 7, 1924 |
| 101,918 | Switzerland | Dec. 1, 1923 |